United States Patent [19]

Löliger

[11] Patent Number: 4,667,699

[45] Date of Patent: May 26, 1987

[54] DEVICE FOR DAMPING FLUID SHOCKS IN PIPE SYSTEMS

[75] Inventor: Willi Löliger, Konolfingen, Switzerland

[73] Assignee: Nestec S.A., Vevey, Switzerland

[21] Appl. No.: 856,030

[22] Filed: Apr. 24, 1986

[30] Foreign Application Priority Data

May 9, 1985 [CH] Switzerland ............... 1965/85

[51] Int. Cl.$^4$ .................................................. F16L 55/04
[52] U.S. Cl. ............................................... 138/31; 99/452
[58] Field of Search .............................. 138/26, 30, 31; 417/540; 137/207; 92/34–36, 39, 41; 267/140.01; 134/105; 99/460, 452

[56] References Cited

U.S. PATENT DOCUMENTS

| | | | |
|---|---|---|---|
| 2,864,403 | 12/1958 | Deily et al. ............... | 138/26 |
| 3,424,202 | 1/1969 | Lincicome ............... | 138/31 |
| 3,442,292 | 5/1969 | Jacuzzi ............... | 138/30 |
| 3,856,048 | 12/1974 | Gratzmuller ............... | 138/31 |
| 4,177,023 | 12/1979 | Kamiya et al. ............... | 138/31 |

FOREIGN PATENT DOCUMENTS 67285 2/1958 France ............... 138/26

Primary Examiner—Stephen Marcus
Assistant Examiner—Leo J. Peters
Attorney, Agent, or Firm—Vogt & O'Donnell

[57] ABSTRACT

For compensating the variations in pressure of a liquid caused in particular by the piston pumps in a network, the device comprises a chamber having an inlet and an outlet for connection in series with said network and a rigid-walled hydropneumatic damping element disposed inside said chamber so that it is completely surrounded by said liquid.

The device may be cleaned and sterilized without dismantling and is particularly suitable for the treatment of sterilized liquids which have to be homogenized, for example, when it is placed between the piston pump of a homogenizer and the homogenization gap.

11 Claims, 2 Drawing Figures

DEVICE FOR DAMPING FLUID SHOCKS IN PIPE SYSTEMS

This invention relates to a device for compensating variations in the pressure and flow rate of a liquid in a circulation network, and more especially in a sterilizable network comprising a piston pump.

Piston pumps have the disadvantage of producing variations in flow. Such variations in flow, particularly at high pressures, produce heavy pulsations in the suction and delivery pipes in the vicinity of the pumps. Phenomena such as these damage the monitoring and control systems, for example for temperature and pressure, and may even lead, in the long term, to rupturing of the pipes.

In the case of high-pressure homogenization, the spacing of the valves of the homogenizer should be selected as a function of flow rate to obtain optimal and constant pressure and flow conditions in the homogenization gaps which is impossible to achieve in practice with a piston pump. In other words, the pulsating nature of the flow is particularly inappropriate.

It is known that the variations in pressure produced by piston pumps, particularly those operating at high pressure, for example homogenizers, can be compensated by means of dampers of the expansion vessel type or expansion element type.

When these pumps are installed in circulation networks operating under sterile conditions, it is important to ensure that the dampers are unable to become seats of infection. This means that they have to be able to be easily cleaned and perfectly sterilized, preferably without dismantling.

The majority of known compensating devices do not satisfy these requirements.

Compensating devices are generally mounted in branches of the network. As a result, they cannot be flooded by chemical cleaning and sterilizing agents, nor can they be sterilized by superheated water circulating in the network using the method commonly adopted for production under aseptic conditions. There is an expansion vessel device provided with a double jacket which is heated by steam during the sterilization process. This arrangement, however, requires separate regulation of the heating circuit and dismantling of the expansion vessel, for cleaning is complicated.

British Pat. Nos. 1 474 655 and 1 550 080 describe expansion devices connected in series with the network comprising chambers containing expansion elements of elastic material (a bladder in the first case, a bladder or sleeve in the second case). The bladder according to GB-PS 1 474 655 is not accessible to the cleaning and sterilizing agents and the device cannot be sterilized. By contrast, the cleaning and sterilizing agents flowing through the network may flow through or around—as required—the sleeve or the bladder according to GB-PS 1 550 080. However, the device remains difficult to sterilize because, despite cleaning, small residual quantities of product can remain between the expansion element and the chamber where they join one another and can create a risk of permanent infection.

The same problem is encountered in the device according to French patent of addition No. 67.285 which is difficult to sterilize.

An expansion device comprising a deformable membrane adapted to meet the requirements of working in aseptic conditions is described in Swiss Pat. No. 510 842. It is easy to clean and sterilize without dismantling because its configuration, without any dead angles and the absence of elastic joints, enables the agents to reach all those parts which have been in contact with the product. One disadvantage of this device and of the other expansion devices mentioned above is that the expansion element has a relatively short useful life when exposed to sterilization temperatures of up to 140° C. and to standard cleaning agents.

The device according to the present invention does not have any of the disadvantages attending known devices and satisfies the requirements of working under aseptic conditions. When it is placed between the high-pressure piston pump of a homogenizer and the homogenization valve, it also enables homogenization to be improved.

The device according to the invention is characterized in that it comprises a chamber, having an inlet and an outlet for connection in series with said network, and a hydropneumatic damping element with rigid walls containing a gas and an aqueous medium, in that said damping element is disposed inside said chamber so that it provides a passage so that it is completely surrounded by said liquid, and in that, in the damping element, the space occupied by the gas is separated in fluid-tight manner from that occupied by the liquid by a piston and in that, in its surface facing the space occupied by the gas, the piston comprises a cavity to contain the aqueous medium.

The invention will be better understood from the following detailed description of various embodiments of the device which are illustrated by way of example in the accompanying drawings, wherein.

In these Figures, the same reference numerals denote the same elements.

Figures 1, 2:
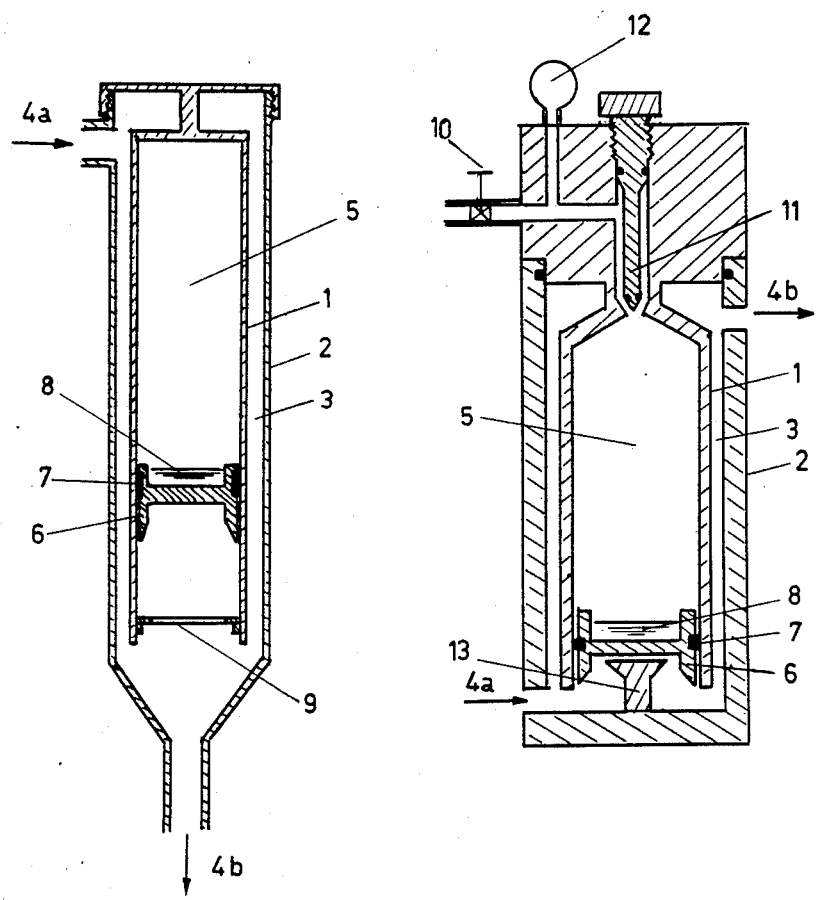
FIG. 1 is a diagrammatic longitudinal section through a first embodiment of the device.
FIG. 2 is a diagrammatic longitudinal section through a second embodiment of the device.

The device shown in FIG. 1 is designed to be mounted in a network through which a liquid circulates at a variable rate of flow under a pressure not exceeding a level of around 981 kPa (10 kg/cm$^2$). It comprises a rigid-walled hollow damping cylinder 1 which is closed at its upper end and open at its lower end. The cylinder is filled with a gas, for example air or nitrogen, before the liquid is circulated.

As illustrated, the damping cylinder is mounted coaxially with pipe which forms a chamber 2 connected in series with the network by the pipes 4a, 4b. The cross-section of the annular passage 3 is preferably equal to that of the pipes 4a, 4b so that the flow rates of the liquid upstream and downstream of the compensating device correspond to the flow rate within the compensating device. The rigid constituent material of the damper may be identical with that of the pipes, for example, stainless steel for the treatment of food products. The damper is preferably mounted perpendicularly to the direction of the inlet pipe 4a to facilitate its installation and dismantling, for example, by screwing onto a screwthreaded end of the chamber 2.

When the liquid is made to circulate through the device in the direction indicated by the arrows, it enters the chamber 2 through the inlet pipe 4a and exits through the outlet pipe 4b. The cylinder partially fills with liquid because its lower end communicates with the chamber 2. The level of the liquid in the cylinder rises when the pressure of the liquid increases in the network and the gas in the space 5 is compressed until its pressure balances that exerted by the liquid.

Certain products, such as liquids not yet saturated with gas, for example liquids which have been degassed, are capable of absorbing gas during production cycles of long duration and, as a result, gradually entrain the gas contained in the damping cylinder which can then no longer perform its function. To avoid this, the device comprises a piston 6 provided with a seal 7 slidingly mounted inside the cylinder 1. The space 5 occupied by the gas is thus separated from the liquid in fluid-tight manner. In its surface facing the space 5, the piston comprises a cavity 8, care having been taken to fill this cavity with an aqueous medium, for example water. The volume of water in the cavity 8 is gauged to provide a saturating atmosphere of steam at sterilization temperatures so as to benefit from the advantages explained hereinafter. An annular stop 9 prevents the piston from dropping out of the cylinder 1. The seal 7 does not undergo any mechanical fatigue during the various phases of sterilization, production and cleaning because the pressures are always identical on each side of the piston.

The liquid circulating in the network may be sterile. In this case, the entire installation must be able to be perfectly sterilized before the circulation of the liquid. This is preferably achieved by circulating superheated water, for example at a temperatures of from 120° to 140° C., through the network for 15 to 30 minutes. Because it circulates around and partly inside the cylinder 1, the superheated water also heats the cylinder 1 and the gas which it contains in the space 5. A saturating steam atmosphere at the same temperature as the superheated water is established in the space 5. This atmosphere has a far greater sterilizing power than a dry gas alone. For example, to obtain the same sterilizing effect over the same period as with steam at 125° C., the temperature of the dry gas, for example air, would have to be 210° C.

After sterilization with superheated water, the same water is cooled upstream of the device and the cooled water surrounds the cylinder and cools it to the working temperature. When the working temperature is reached, the sterilizing water may be pumped through with the sterile liquid, for example milk, and production commenced under aseptic conditions.

When the production cycle is over, the network has to be cleaned. This may be done, for example in the food industry, by rinsing with water, with a solution of alkali and then finally with a solution of acid. Due to the pulsating nature of the flow, the level of the liquid in the damping cylinder rises and falls with each pulsation although the residual liquid is progressively replaced by the rinsing solutions in the lower part of the cylinder situated below the piston 6. This means that, in the majority of cases, the cleaning agents are also able to wet the inner walls of the lower part of the cylinder, thus ensuring impeccable cleaning.

The embodiment shown in FIG. 2 is adapted for networks in which high pressures of >981 kPa (10 kg/cm$^2$), for example of the order of 14.7 to 54 MPa (150 to 550 kg/cm$^2$), prevail, as is the case between the high-pressure piston pump and the homogenization valve of a homogenizer. In this case, it is important to take care that the damping cylinder withstands such conditions. Its dimensions will preferably be chosen as small as possible both for reasons of mechanical strength and for reasons of compactness, the optimal values and the thickness of its walls being able to be determined as a function of the pressure, the number of pistons of the pump and the frequency of their movement.

To enable it to perform its function of damper despite its small dimensions, it is of advantage to place the cylinder under tension by means of a gas before it is brought into operation. The pressure prevailing in the space 5 and the volume of said space will be able to be determined as a function of the working pressure, the volume of circulating product and the frequency of cleaning, by analogy with known bladder-type dampers. For example, the space 5 occupied by the gas will represent from 20 to 50% and preferably around ⅓ of the interior volume of the cylinder under the normal operating conditions used for production.

Before the network is brought into operation, the cylinder 1 is filled with a gas emanating from a source (not shown) by opening of the valve 10 and the valve 11 until the pressure observed by reading the manometer 12 is reached. The piston 6 may be kept above the lower end of the cylinder and prevented by dropping out by the stop 13. When the desired pressure is reached, the valves 10 and 11 are closed and the damper is ready for operation. Sterilization and operation take place in the same way as described above with reference to the embodiment shown in FIG. 1. As illustrated in FIG. 2, the damper is mounted perpendicularly to each of inlet pipe 4$a$ and outlet pipe 4$b$. It can be seen that, as before, the piston seal 7 does not undergo mechanical fatigue and has a long useful life despite working at high pressure.

The device according to the invention may be used in the treatment of liquid products, for example emulsions or dispersions in or outside the food industry. It is particularly advantageous for treating products which have to be sterilized and, if necessary, homogenized after sterilization, for example cosmetic, pharmaceutical and food products and, among food products, particularly dairy products.

I claim:

1. A device for compensating variations in pressure and flow rate of a liquid in a circulation network comprising:
    (a) a hollow damping element having sidewalls and one closed end;
    (b) a piston, having a fluid-tight seal, slidable and maintained within the damping element;
    (c) a gas and an aqueous medium maintained within the damping element by the piston, sidewalls and closed end; and
    (d) a chamber, having an inlet and outlet for connection with said network, within which the damping element is disposed such that there is a passage to allow the liquid to flow and circulate from the inlet to the outlet about and surrounding the damping element.

2. A device as claimed in claim 1, further comprising means for placing the gas in the damping element under pressure.

3. A device as claimed in claim 1 or 2, wherein the chamber and the damping element are cylindrical in shape and are coaxially arranged and form an annular passage between the chamber and the damping element.

4. A device as claimed in claim 3, wherein the cross-section of the annular passage is equal to the cross-section of the inlet and outlet openings of said chamber.

5. A device as claimed in claim 1 or 2, wherein the piston has a cavity to contain the aqueous medium.

6. A device as claimed in claim 1 or 2, wherein the piston is maintained within the damping element by a stop disposed within the damping element.

7. A device as claimed in claim 1 or 2, wherein the piston is maintained within the damping element by a stop disposed within the chamber.

8. A device as claimed in claim 1 or 2, wherein the damping element and chamber extend perpendicularly from the direction of the inlet.

9. A device as claimed in claim 8, wherein the damping element and chamber extend perpendicularly from the direction of the outlet.

10. A device as claimed in claim 1 or 2, wherein the damping element and chamber are in series in the circulation network.

11. A device as claimed in claim 1 or 2, wherein the circulation network is a sterilization network and the device is positioned between a piston pump of a homogenizer and a homogenization gap.

* * * * *